US012431047B2

(12) United States Patent
Kang et al.

(10) Patent No.: US 12,431,047 B2
(45) Date of Patent: Sep. 30, 2025

(54) DISPLAY DEVICE AND INSPECTION METHOD THEREOF

(71) Applicant: SAMSUNG DISPLAY CO., LTD., Yongin-si (KR)

(72) Inventors: Ki Nyeng Kang, Yongin-si (KR); Min Joo Kim, Yongin-si (KR); Tae Hoon Yang, Yongin-si (KR); Sang Hoon Lee, Yongin-si (KR); Seon Beom Ji, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 176 days.

(21) Appl. No.: 18/306,206

(22) Filed: Apr. 24, 2023

(65) Prior Publication Data

US 2023/0267862 A1 Aug. 24, 2023

Related U.S. Application Data

(63) Continuation of application No. 17/116,206, filed on Dec. 9, 2020, now Pat. No. 11,636,788.

(30) Foreign Application Priority Data

Mar. 16, 2020 (KR) ........................ 10-2020-0032003

(51) Int. Cl.
*G09G 3/00* (2006.01)
*G09G 3/32* (2016.01)

(52) U.S. Cl.
CPC ............... *G09G 3/006* (2013.01); *G09G 3/32* (2013.01); *G09G 2310/0278* (2013.01)

(58) Field of Classification Search
CPC ... G09G 2300/0426; G09G 2300/0861; G09G 2300/0885; G09G 2310/0278;
(Continued)

(56) References Cited

U.S. PATENT DOCUMENTS 7,679,587 B2 3/2010 Kwak
10,283,047 B2 5/2019 Shin et al.
(Continued)

FOREIGN PATENT DOCUMENTS

CN 1779764 A 5/2006
CN 106991967 A 7/2017
(Continued)

*Primary Examiner* — Judy Nguyen
*Assistant Examiner* — Brent J Andrews
(74) *Attorney, Agent, or Firm* — Womble Bond Dickinson (US) LLP

(57) ABSTRACT

A display device inspection method includes: checking connection failures of light emitting elements included in a pixel and connected in series based on a first control signal, a second control signal, and a voltage of an initialization power source, wherein the pixel comprises: a pixel circuit controlling a current flowing from a first power source to a second node in response to a voltage of a first node; a first light emitting element connected to the second node; a first transistor controlling the voltage of the initialization power source supplied to the second node; a second light emitting element electrically connected between the first light emitting element and a second power source; and a second transistor having a first electrode connected to a third node between the first light emitting element and the second light emitting element, and a gate electrode connected to a first inspection control line.

8 Claims, 14 Drawing Sheets

(58) Field of Classification Search

CPC ........ G09G 3/006; G09G 3/32; G09G 3/3233; G09G 1/00; G09G 3/00; G09G 5/00; G09G 2230/00; G09G 2290/00; G09G 2300/00; G09G 2310/00; G09G 2320/00; G09G 2330/00; G09G 2340/00; G09G 2350/00; G09G 2352/00; G09G 2354/00; G09G 2356/00; G09G 2358/00; G09G 2360/00; G09G 2370/00; G09G 2380/00

See application file for complete search history.

(56) References Cited

U.S. PATENT DOCUMENTS

| | | | | |
|---|---|---|---|---|
| 10,354,591 | B2 | 7/2019 | Zhou et al. | |
| 10,535,306 | B2 | 1/2020 | Yang et al. | |
| 11,087,653 | B2 | 8/2021 | Cho et al. | |
| 11,138,933 | B2 | 10/2021 | Hsu et al. | |
| 2007/0262920 | A1 * | 11/2007 | Werner | H05B 45/46 345/46 |
| 2015/0268763 | A1 | 9/2015 | Zhou et al. | |
| 2021/0143137 | A1 | 5/2021 | Kim et al. | |

FOREIGN PATENT DOCUMENTS

| | | | | | |
|---|---|---|---|---|---|
| CN | 107731167 | A | | 2/2018 | |
| CN | 110097842 | A | * | 8/2019 | G09G 3/006 |
| CN | 110288940 | A | | 9/2019 | |
| CN | 110853555 | A | | 2/2020 | |
| KR | 10-2018-0025514 | A | | 3/2018 | |
| KR | 10-2021-0057891 | A | | 5/2021 | |

* cited by examiner

DISPLAY DEVICE AND INSPECTION METHOD THEREOF

CROSS-REFERENCE TO RELATED APPLICATIONS

This application is a continuation of U.S. patent application Ser. No. 17/116,206, filed Dec. 9, 2020, which claims priority to and the benefit of Korean Patent Application No. 10-2020-0032003, filed Mar. 16, 2020, the entire content of both of which is incorporated herein by reference.

BACKGROUND

1. Field

Aspects of some example embodiments of the present invention relate to an electronic device, and for example, to a display device and an inspection method thereof.

2. Discussion

A display device generally displays images using pixels connected to scan lines and data lines. To this end, each of the pixels includes a light emitting element and a driving transistor.

The driving transistor controls the amount of current supplied to the light emitting element in response to a data signal supplied from a data line. The light emitting element emits light having a luminance (e.g., a set or predetermined luminance) corresponding to the amount of current supplied from the driving transistor.

For example, the luminance of light emitted from the light emitting element can be controlled according to the amount of current supplied to the light emitting element, and the light emitting element may have diode characteristics. When a single pixel includes a plurality of light emitting elements, a structure in which the light emitting elements controlled by the current are connected in series may be advantageous in terms of power consumption than a structure in which the light emitting elements are connected in parallel.

However, when one of the light emitting elements connected in series is opened and/or shorted, corresponding pixel may not emit light. Therefore, a technique for detecting connection failure of each of the light emitting elements connected (or aligned) in series may be utilized.

The above information disclosed in this Background section is only for enhancement of understanding of the background and therefore the information discussed in this Background section does not necessarily constitute prior art.

SUMMARY

Aspects of some example embodiments of the present invention include an inspection method of a display device capable of detecting connection failure of each of light emitting elements connected in series.

Aspects of some example embodiments of the present invention include a display device including transistors connected to each of the light emitting elements to detect the connection failure of each of the light emitting elements connected in series.

However, aspects of embodiments according to the present invention are not limited to the above-described characteristics, and may be variously extended without departing from the spirit and scope of embodiments according to the present invention.

An inspection method of a display device according to some example embodiments of the present invention may include: checking connection failures of light emitting elements included in a pixel and connected in series based on a first control signal, a second control signal, and a voltage of an initialization power source. The pixel may include: a pixel circuit controlling a current flowing from a first power source to a second node in response to a voltage of a first node; a first light emitting element connected to the second node; a first transistor controlling the voltage of the initialization power source supplied to the second node; a second light emitting element electrically connected between the first light emitting element and a second power source; and a second transistor having a first electrode connected to a third node between the first light emitting element and the second light emitting element, and a gate electrode connected to a first inspection control line.

According to some example embodiments, the first transistor may be connected between the second node and a sensing line, and a second electrode of the second transistor may be connected to the second power source. The checking the connection failures of the light emitting elements may include: supplying the initialization power source of a first voltage level to the sensing line, and turning on the first transistor and the second transistor; determining that a connection of the second light emitting element is abnormal when the pixel emits light; and determining that a connection of the first light emitting element is abnormal when the pixel does not emit light.

According to some example embodiments, the first transistor may be turned on in response to the first control signal, and the second transistor may be turned on in response to the second control signal supplied to the first inspection control line.

According to some example embodiments, the pixel circuit may include: a third transistor connected between the first power source and the second node, and having a gate electrode connected to the first node; a fourth transistor connected between the first node and a data line, and having a gate electrode connected to a scan line; and a storage capacitor connected between the first node and the second node. A gate electrode of the first transistor may be connected to a control line transmitting the first control signal.

According to some example embodiments, the fourth transistor may be turned off during a period in which the first transistor and the second transistor are turned on.

According to some example embodiments, the first transistor may be connected between the second node and the sensing line, and the second electrode of the second transistor may be connected to a first inspection power source line supplying a voltage of a lighting inspection power source. The checking the connection failures of the light emitting elements may include: checking a connection failure of the first light emitting element based on the initialization power source; and checking a connection failure of the second light emitting element based on the lighting inspection power source.

According to some example embodiments, the checking the connection failure of the first light emitting element may include: supplying the initialization power source having the first voltage level to the sensing line, and supplying the lighting inspection power source having a second voltage level lower than the first voltage level to the first inspection power source line; turning on the first transistor and the second transistor; determining that the connection of the first light emitting element is normal when the pixel emits light;

and determining that the connection of the first light emitting element is abnormal when the pixel does not emit light.

According to some example embodiments, the checking the connection failure of the second light emitting element may include: supplying the initialization power source having a third voltage level lower than the first voltage level to the sensing line, and supplying the lighting inspection power source having a fourth voltage level higher than the second voltage level to the first inspection power source line; turning on the second transistor; determining that the connection of the second light emitting element is normal when the pixel emits light; and determining that the connection of the second light emitting element is abnormal when the pixel does not emit light.

According to some example embodiments, the second transistor may be turned on at the same time as the first transistor.

According to some example embodiments, the pixel may further include: a third light emitting element electrically connected between the second light emitting element and the second power source; and a fifth transistor having a first electrode connected to a fourth node between the second light emitting element and the third light emitting element, and a gate electrode connected to a second inspection control line.

According to some example embodiments, a second electrode of the fifth transistor may be connected to the second power source, and in the checking the connection failure of the first light emitting element, the fifth transistor may be turned on at the same time as the second transistor in response to a third control signal supplied to the second inspection control line.

According to some example embodiments, the first voltage level may be higher than the second voltage level, and the fourth voltage level may be higher than or equal to the third voltage level.

According to some example embodiments, the fourth voltage level may be higher than a voltage level of the second power source, and the second voltage level may be lower than the voltage level of the second power source.

According to some example embodiments, the second electrode of the fifth transistor may be connected to the second power source, and in the checking the connection failure of the second light emitting element, the fifth transistor may be turned on at the same time as the second transistor in response to the third control signal supplied to the second inspection control line.

According to some example embodiments, the second electrode of the fifth transistor may be connected to a second inspection power source line supplying a voltage of an additional lighting inspection power source. The checking the connection failures of the light emitting elements may include: checking a connection failure of the third light emitting element based on the additional lighting inspection power source.

According to some example embodiments, the checking the connection failure of the third light emitting element may include: supplying the initialization power source having the third voltage level to the sensing line, supplying the lighting inspection power source having the fourth voltage level to the first inspection power source line, and supplying the additional lighting inspection power source having a fifth voltage level higher than the fourth voltage level to the second inspection power source line; turning on the first transistor, the second transistor, and the fifth transistor; determining that a connection of the third light emitting element is normal when the pixel emits light; and determining that the connection of the third light emitting element is abnormal when the pixel does not emit light.

According to some example embodiments, the checking the connection failures of the light emitting elements may include: emitting light all pixels included in a pixel unit before checking the connection failures of the light emitting elements; determining a pixel represented by a dark point as a defective pixel by analyzing luminance of the pixels; and checking the connection failures of the light emitting elements with respect to the defective pixel.

A display device according to some example embodiments of the present invention may include: pixels connected to scan lines, control lines, inspection control lines, data lines, and sensing lines; a scan driver supplying a scan signal to the scan lines and supplying a control signal to the control lines; a data driver supplying one of an image data signal and a sensing data signal to the data lines; and a sensing circuit sensing characteristics of the pixels based on a sensing value supplied through the sensing lines. A pixel positioned on an i-th horizontal line among the pixels, where i is a natural number, may include: a pixel circuit controlling a current flowing from a first power source to a second node in response to a voltage of a first node; a first light emitting element connected to the second node; a first transistor controlling a voltage of an initialization power source supplied to the second node; a second light emitting element electrically connected between the first light emitting element and a second power source; and a second transistor having a first electrode connected to a third node between the first light emitting element and the second light emitting element, and a gate electrode connected to an i-th first inspection control line.

According to some example embodiments, the pixel circuit may include: a third transistor connected between the first power source and the second node, and having a gate electrode connected to the first node; a fourth transistor connected between the first node and one of the data lines, and having a gate electrode connected to an i-th scan line; and a storage capacitor connected between the first node and the second node. The first transistor may be connected between the second node and one of the sensing lines, and the first transistor may include a gate electrode connected to an i-th control line transmitting a first control signal. A second electrode of the second transistor may be connected to a first inspection power source line supplying a voltage of a lighting inspection power source.

According to some example embodiments, when inspecting a connection failure of the first light emitting element, the first transistor and the second transistor may be turned on at the same time, and the voltage of the initialization power source supplied to the sensing lines may be higher than the voltage of the lighting inspection power source. When inspecting a connection failure of the second light emitting element, the first transistor and the second transistor may be turned on at the same time, the voltage of the initialization power source supplied to the sensing lines may be lower than the voltage of the lighting inspection power source, and the voltage of the lighting inspection power source may be higher than a voltage of the second power source.

BRIEF DESCRIPTION OF THE DRAWINGS

The accompanying drawings, which are included to provide a further understanding of the inventive concepts, and are incorporated in and constitute a part of this specification, illustrate aspects of some example embodiments of the inventive concepts, and, together with the description, serve to explain principles of the inventive concepts.

DETAILED DESCRIPTION

Figure 1:
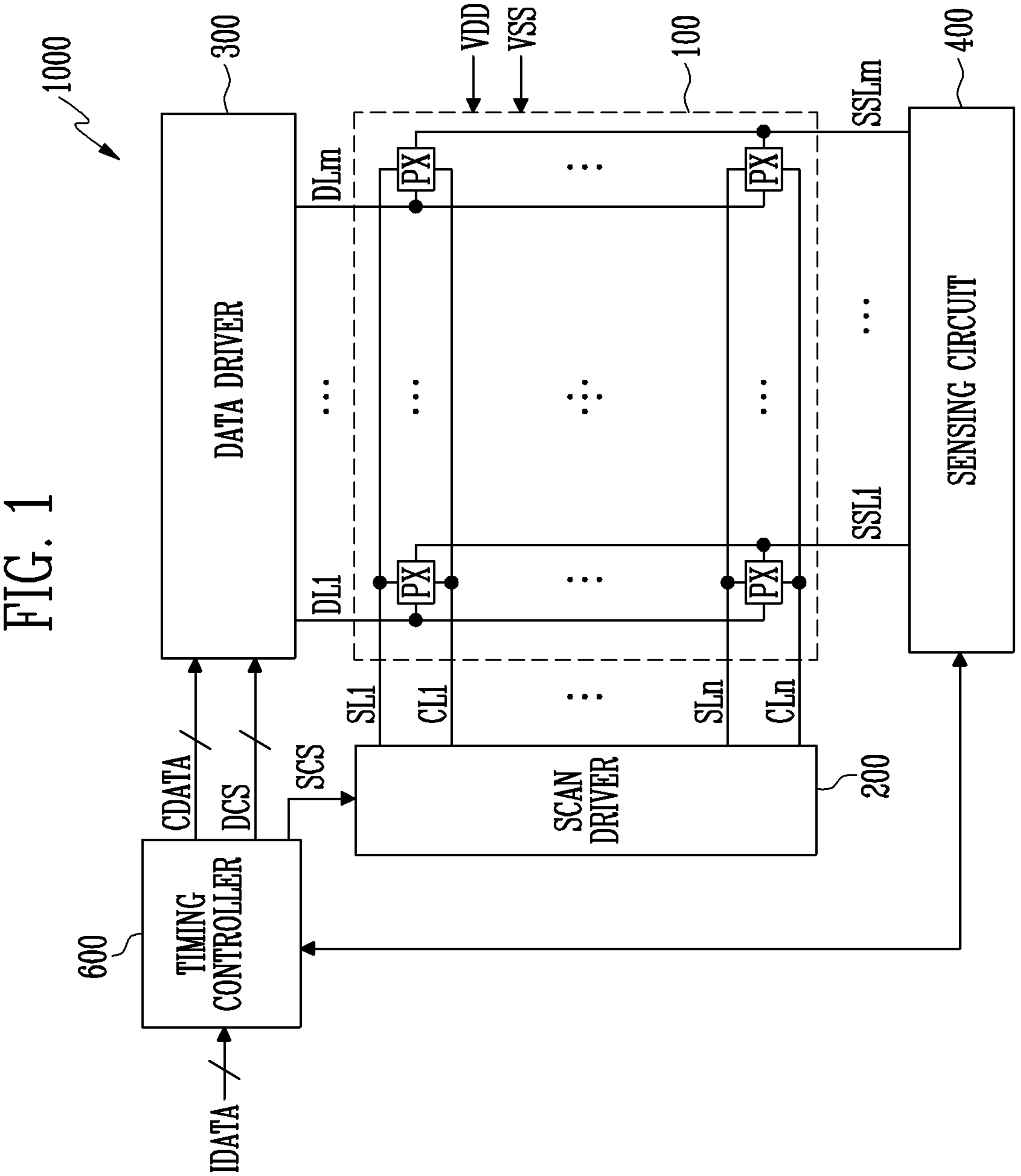
FIG. 1 is a block diagram illustrating a display device according to some example embodiments of the present invention.

Hereinafter, aspects of some example embodiments of the present invention will be described in more detail with reference to the accompanying drawings. The same reference numerals are used for the same components in the drawings, and some duplicate descriptions for the same components may be omitted.

Figure 2:
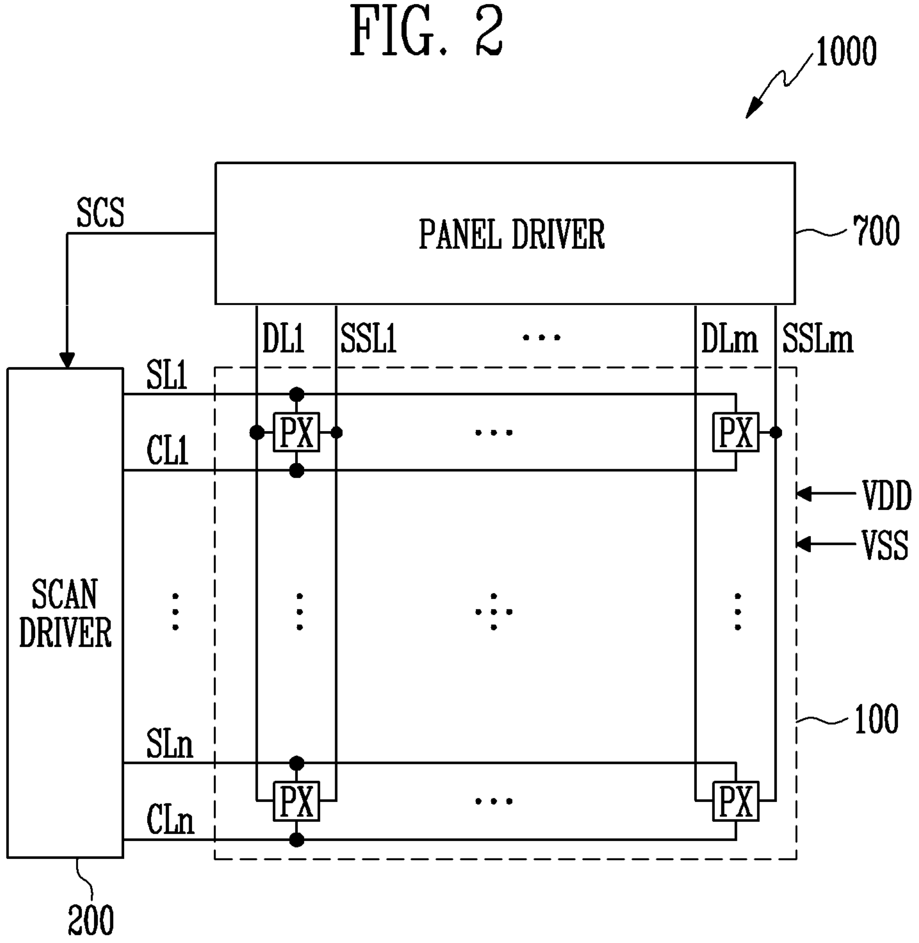
FIG. 2 is a block diagram illustrating an example of the display device of FIG. 1.

FIG. 1 is a block diagram illustrating a display device according to some example embodiments of the present invention. FIG. 2 is a block diagram illustrating an example of the display device of FIG. 1.

Referring to FIGS. 1 and 2, a display device 1000 may include a pixel unit 100, a scan driver 200, a data driver 300, a sensing circuit 400, and a timing controller 600.

The display device 1000 may be a flat panel display device, a flexible display device, a curved display device, a foldable display device, or a bendable display device. In addition, the display device 1000 may be applied to a transparent display device, a head-mounted display device, a wearable display device, and the like. Also, the display device 1000 may be applied to various electronic devices such as a smart phone, a tablet, a smart pad, a TV, and a monitor.

The display device 1000 may be implemented as an organic light emitting display device, a liquid crystal display device, or the like. However, this is an example, and the configuration of the display device 1000 is not limited thereto. For example, the display device 1000 according to some example embodiments may be a self-light emitting display device including an inorganic light emitting element.

According to some example embodiments, the display device 1000 may be driven by being divided into a display period for displaying an image and a sensing period for sensing characteristics of a driving transistor included in each of pixels PX.

The pixel unit 100 may include the pixels PX connected to data lines DL1 to DLm, scan lines SL1 to SLn, control lines CL1 to CLn, and sensing lines SSL1 to SSLm, where m and n are natural numbers. The pixels PX may be provided with voltages of a first power source VDD and a second power source VSS from outside.

Although n scan lines SL1 to SLn are shown in FIG. 1, embodiments according to the present invention are not limited thereto. For example, one or more control lines, scan lines, and sensing lines may be additionally formed in the pixel unit 100 in correspondence to a circuit structure of the pixels PX.

According to some example embodiments, transistors included in a pixel PX may be N-type oxide thin film transistors. For example, the oxide thin film transistors may be low temperature polycrystalline oxide (LTPO) thin film transistors. However, this is an example, and N-type transistors are not limited thereto. For example, active patterns (semiconductor layers) included in the transistors may include an inorganic semiconductor (for example, amorphous silicon or poly silicon), an organic semiconductor, or the like. Also, at least one of the transistors included in the display device 1000 and/or the pixel PX may be replaced with a P-type transistor.

The timing controller 600 may generate a data driving control signal DCS and a scan driving control signal SCS in response to synchronization signals supplied from the outside. The data driving control signal DCS generated by the timing controller 600 may be supplied to the data driver 300, and the scan driving control signal SCS may be supplied to the scan driver 200.

In addition, the timing controller 600 may supply image data CDATA compensated based on input image data IDATA to the data driver 300. The input image data IDATA and the compensated image data CDATA may include grayscale information included in a grayscale range set in the display device.

The data driving control signal DCS may include a source start signal and data clock signals. The source start signal may control a start time point for sampling data. The data clock signals may be used to control the sampling operation.

The scan driving control signal SCS may include a scan start signal, a control start signal, and scan clock signals. The scan start signal may control the timing of a scan signal. The control start signal may control the timing of a control signal. The scan clock signals may be used to shift the scan start signal and/or the control start signal.

The timing controller 600 may control an operation of the sensing circuit 400. For example, the timing controller 600 may control the timing for supplying a voltage of an initialization power source to the pixels PX through the sensing lines SSL1 to SSLm and/or the timing for sensing a current generated in the pixel PX through the sensing lines SSL1 to SSLm. Here, the initialization power source is a term defined arbitrarily for convenience of description, and is not interpreted to be limited to the term.

The scan driver 200 may receive the scan driving control signal SCS from the timing controller 600. The scan driver 200 receiving the scan driving control signal SCS may supply the scan signal to the scan lines SL1 to SLn, and the control signal to the control lines CL1 to CLn.

For example, the scan driver 200 may sequentially supply the scan signal to the scan lines SL1 to SLn. When the scan signal is sequentially supplied to the scan lines SL1 to SLn, the pixels PX may be selected in units of horizontal lines.

Similarly, the scan driver 200 may supply the control signal to the control lines CL1 to CLn. The control signal may be used to sense (or extract) the driving current flowing through the pixel (that is, the current flowing through the driving transistor). The timing and the waveform to which the scan signal and the control signal are supplied may be set differently according to the display period and the sensing period.

According to some example embodiments, the control signal may be supplied to a light emitting element to emit light during lighting inspection.

In FIG. 1, one scan driver 200 outputs both the scan signal and the control signal, but embodiments according to the present invention are not limited thereto. For example, the scan driver 200 may include a first scan driver for supplying the scan signal to the pixel unit 100 and a second scan driver for supplying the control signal to the pixel unit 100.

The data driver 300 may receive the data driving control signal DCS from the timing controller 600. The data driver 300 may supply a data signal (for example, a sensing data signal) for detecting pixel characteristics to the pixel unit 100 during the sensing period. The data driver 300 may supply the data signal for displaying the image to the pixel unit 100 based on the compensated image data CDATA during the display period.

The sensing circuit 400 may generate a compensation value that compensates for a characteristic value of the pixels PX based on sensing values provided from the sensing lines SSL1 to SSLm. For example, the sensing circuit 400 may detect and compensate for changes in threshold voltage and mobility of the driving transistor included in the pixel PX, changes in characteristics of the light emitting element, and the like.

According to some example embodiments, during the sensing period, the sensing circuit 400 may supply a reference voltage (e.g., a set or predetermined reference voltage) (or an initialization voltage) to the pixels PX through the sensing lines SSL1 to SSLm, and receive a current or voltage extracted from the pixel PX. The extracted current or voltage may be correspond to a sensing value, and the sensing circuit 400 may detect a characteristic change of the driving transistor based on the sensing value. The sensing circuit 400 may calculate a compensation value for compensating the input image data IDATA based on the detected characteristic change. The compensation value may be provided to the timing controller 600 or the data driver 300.

During the display period, the sensing circuit 400 may supply a voltage (e.g., a set or predetermined voltage) of the initialization power source for displaying the image to the pixel unit 100 through sensing lines SSL1 to SSLm.

Although the sensing circuit 400 is shown as having a separate configuration from the timing controller 600 in FIG. 1, at least a portion of the configuration of the sensing circuit 400 may be included in the timing controller 600. For example, the sensing circuit 400 and the timing controller 600 may be formed of one driving IC. Furthermore, the data driver 300 may also be included in the timing controller 600.

At least some of the sensing circuit 400, the data driver 300, and the timing controller 600 may be formed of one driving IC. According to some example embodiments, as shown in FIG. 2, a panel driver 700 implemented as one driving IC may perform all functions of the sensing circuit 400, the data driver 300, and the timing controller 600.

Figure 3:
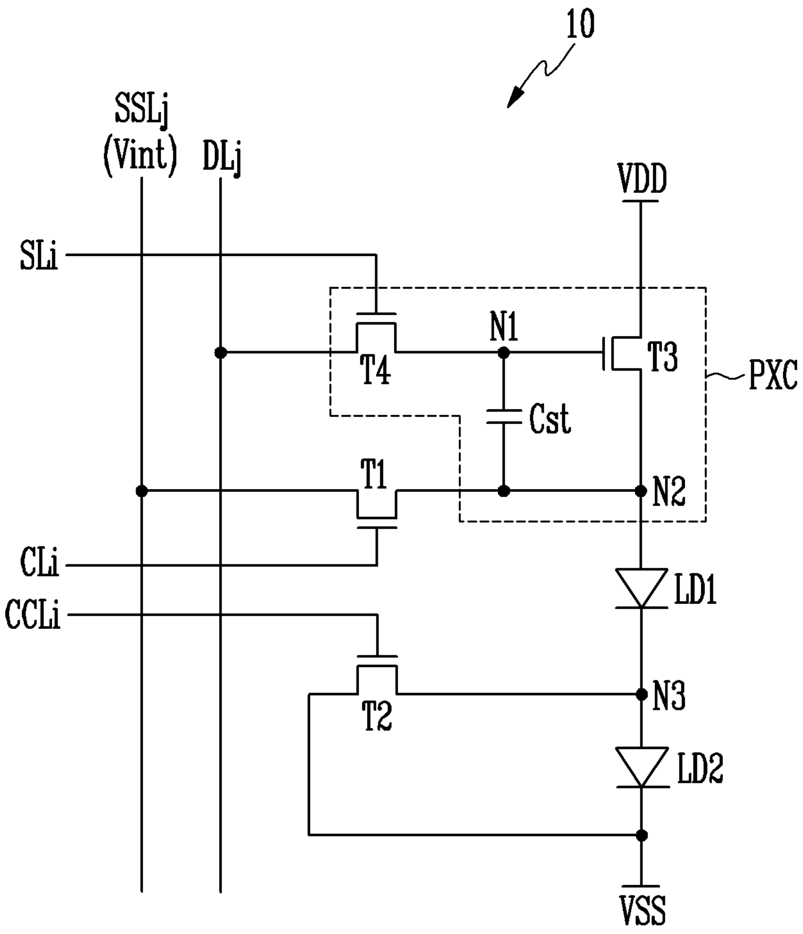
FIG. 3 is a circuit diagram illustrating an example of a pixel included in the display device of FIG. 1.

FIG. 3 is a circuit diagram illustrating an example of a pixel included in the display device of FIG. 1.

In FIG. 3, for convenience of description, a pixel 10 positioned on an i-th horizontal line and connected to a j-th data line DLj is shown.

Referring to FIGS. 1 and 3, the pixel 10 may include a plurality of light emitting elements LD1 and LD2, a first transistor T1, a second transistor T2, and a pixel circuit PXC.

According to some example embodiments, the pixel circuit PXC may include a third transistor T3 (a driving transistor), a storage capacitor Cst, and a fourth transistor T4.

According to some example embodiments, the light emitting elements LD1 and LD2 may include a first light emitting element LD1 and a second light emitting element LD2 connected in series. However, this is an example, and the pixel 10 may further include light emitting elements connected in series with the first and second light emitting elements LD1 and LD2. In addition, the pixel 10 may further include light emitting elements connected in parallel with the first light emitting element LD1 or the second light emitting element LD2.

According to some example embodiments, the first and second light emitting elements LD1 and LD2 may be ultra-small light emitting elements having a size as small as nano-scale to micro-scale. These ultra-small light emitting elements may include a material having an inorganic crystal structure, and the material having the inorganic crystal structure may emit light. However, this is merely an example, and at least one of the first and second light emitting elements LD1 and LD2 may be an organic light emitting element.

A first electrode (for example, an anode) of the first light emitting element LD1 may be connected to a second node N2 and a second electrode (for example, a cathode) of the first light emitting element LD1 may be connected to a third node N3. A first electrode of the second light emitting element LD2 may be connected to the third node N3, and a second electrode of the second light emitting element LD2 may be electrically connected to the second power source VSS. The first and second light emitting elements LD1 and LD2 may emit light having a luminance (e.g., a set or predetermined luminance) corresponding to the amount of current supplied from the pixel circuit PXC or the third transistor T3. That is, the first and second light emitting elements LD1 and LD2 may be driven by the current and may have driving characteristics such as light emitting diodes.

The pixel circuit PXC may control the current flowing from the first power source VDD to the second node N2 in response to a voltage of the first node N1. The pixel circuit PXC may include various known transistor connection relationships. For example, the pixel circuit PXC may include four or more transistors including the driving transistor.

A first electrode of the third transistor T3 may be connected to the first power source VDD, and a second electrode of the third transistor T3 may be connected to the second node N2. A gate electrode of the third transistor T3 may be connected to the first node N1. The third transistor T3 may control the amount of current flowing through the first and second light emitting elements LD1 and LD2 in response to the voltage of the first node N1.

A first electrode of the fourth transistor T4 may be connected to a data line DLj, and a second electrode of the fourth transistor T4 may be connected to the first node N1. A gate electrode of the fourth transistor T4 may be connected to a scan line SLi. The fourth transistor T4 may be turned on when the scan signal is supplied to the scan line SLi to transfer the data signal from the data line DLj to the first node N1.

The first transistor T1 may be connected between a sensing line SSLj and the second electrode (that is, the second node N2) of the third transistor T3. A gate electrode of the first transistor T1 may be connected to a control line CLi. The first transistor T1 may be turned on when a first control signal is supplied to the control line CLi to electrically connect the sensing line SSLj and the second node N2 (that is, the second electrode of the third transistor T3).

According to some example embodiments, when the first transistor T1 is turned on, the voltage of the initialization power source Vint may be supplied to the second node N2. According to some example embodiments, when the first transistor T1 is turned on, the current generated by the third transistor T3 may be supplied to the sensing circuit 400.

The storage capacitor Cst may be connected between the first node N1 and the second node N2. The storage capacitor Cst may store a voltage corresponding to a voltage difference between the first node N1 and the second node N2.

According to some example embodiments, a first electrode of the second transistor T2 may be connected to the third node N3, and a second electrode of the second transistor T2 may be connected to the second power source VSS. A gate electrode of the second transistor T2 may be connected to an inspection control line CCLi (or a first inspection control line).

The second transistor T2 may be turned on when a second control signal is supplied to the inspection control line CCLi to electrically connect the third node N3 and the second power source VSS. In other words, when the second transistor T2 is turned on, a bypass may be formed between the first light emitting element LD1 and the second power source VSS. The second transistor T2 may be used to inspect (and check) a connection state of the first light emitting element LD1 between the second node N2 and the third node N3.

When the second light emitting element LD2 is normally connected, the second transistor T2 may maintain a turn-off state during the display period for displaying the image.

However, when the second light emitting element LD2 is in an electrically open state between the third node N3 and the second power source VSS, the second transistor T2 may maintain a turn-on state for bypass during the display period.

In the embodiments of the present invention, the structure of the pixel circuit PXC of the pixel 10 is not limited only by the embodiment of FIG. 3.

Figure 4:
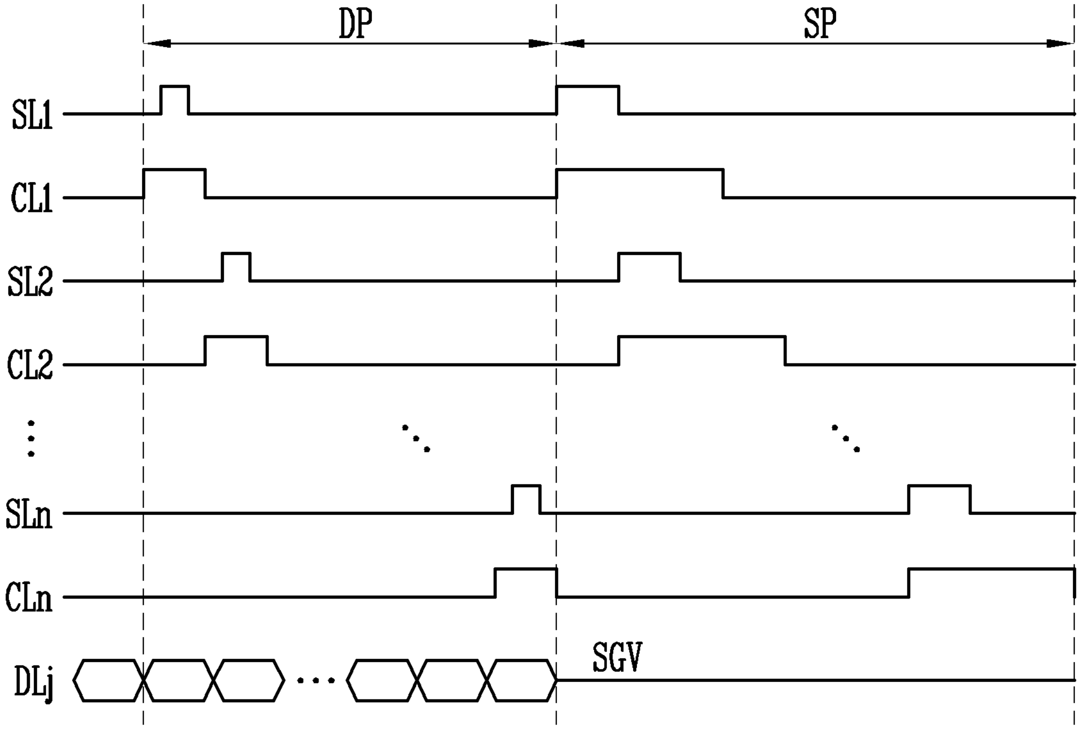
FIG. 4 is a timing diagram illustrating an example of an operation of the display device including the pixel of FIG. 3.

FIG. 4 is a timing diagram illustrating an example of an operation of the display device including the pixel of FIG. 3.

FIG. 4 shows an example of signals supplied to the pixels arranged on a j-th vertical line (or a pixel column).

Referring to FIGS. 1, 3 and 4, the display device 1000 may be driven by being divided into a display period DP for displaying the image and a sensing period SP for sensing characteristics of the third transistor T3 included in each of the pixels PX (refer to FIG. 1).

According to some example embodiments, in the sensing period SP, an image data may be compensated based on the sensed characteristic information.

During the display period DP, the voltage of the initialization power source Vint having a voltage level (e.g., a set or predetermined voltage level) may be supplied to the sensing lines SSL1 to SSLm. According to some example embodiments, the voltage of the initialization power source Vint supplied during the display period DP may be set to a value higher than a voltage of the second power source VSS.

During the display period DP, the scan driver 200 may sequentially supply the scan signal to the scan lines SL1 to SLn. In addition, during the display period DP, the scan driver 200 may sequentially supply the control signal to the control lines CL1 to CLn.

According to some example embodiments, a length of the control signal supplied in the display period DP may be longer than a length of the scan signal. Also, a portion of the control signal supplied to an i-th control line CLi in the display period DP may overlap the scan signal supplied to an i-th scan line SLi.

When the fourth transistor T4 is turned on, the data signal corresponding to the image data may be supplied to the first node N1. When the first transistor T1 is turned on, an initialization voltage Vint may be supplied to the second node N2. Therefore, the storage capacitor Cst may store a voltage corresponding to a voltage difference between the data signal and the initialization voltage Vint.

Here, because the initialization voltage Vint is set to a constant voltage during the display period DP, the voltage stored in the storage capacitor Cst may be stably determined by the data signal.

When supply of the scan signal and the control signal to the i-th scan line SLi and the i-th control line CLi is stopped, the first transistor T1 and the fourth transistor T4 may be turned off.

Thereafter, the third transistor T3 may control the amount of current (the driving current) supplied to the first and second light emitting elements LD1 and LD2 in response to the voltage stored in the storage capacitor Cst. Accordingly, the first and second light emitting elements LD1 and LD2 may emit light with luminance corresponding to the driving current.

According to some example embodiments, during the sensing period SP, the scan driver 200 may sequentially supply the scan signal to the scan lines SL1 to SLn. Also, during the sensing period SP, the scan driver 200 may sequentially supply the control signal to the control lines CL1 to CLn.

According to some example embodiments, the length of the control signal supplied in the sensing period SP may be longer than the length of the control signal supplied in the display period DP. Also, in the sensing period SP, the portion of the control signal supplied to the i-th control line CLi may overlap the scan signal supplied to the i-th scan line SLi.

When the scan signal and the control signal are simultaneously supplied, the first and fourth transistors T1 and T4 are turned on. When the fourth transistor T4 is turned on, a sensing data signal SGV (or a sensing data voltage) for sensing may be supplied to the first node N1 through the data line DLj. At the same time, when the first transistor T1 is turned on, the voltage of the initialization power source Vint may be supplied to the second node N2. Accordingly, a voltage corresponding to a voltage difference between the sensing data signal SGV and the initialization power source Vint may be stored in the storage capacitor Cst.

Thereafter, when supply of the scan signal is stopped, the fourth transistor T4 may be turned off. When the fourth transistor T4 is turned off, the first node N1 may be floated. Accordingly, a voltage of the second node N2 may rise, and a sensing current may be generated through the third transistor T3. During the voltage rises, the sensing current may flow to the sensing line SSLj. The sensing circuit 400 may compensate for the image data by analyzing the sensing current.

According to some example embodiments, the sensing period SP may be performed at least once before the display device 1000 is shipped. In this case, before the display device 1000 is shipped, initial characteristic information of the third transistors T3 may be stored, and by using this characteristic information to compensate the input image data IDATA, the pixel unit 100 may display the image with uniform image quality.

In addition, the sensing period SP may be performed every time period (e.g., every set or predetermined time period) even while the display device 1000 is used. For example, the sensing period SP may be arranged in a portion of the time when the display device 1000 is turned on and/or turned off. Then, even if the characteristics of the third transistor T3 of each of the pixels PX change according to the amount of use, the characteristic information may be updated in real time to be reflected in generation of the data signal. However, this is an example, and the sensing period SP may be inserted between display periods (e.g., set or predetermined display periods) DP. Therefore, the pixel unit 100 may continuously display the image with uniform image quality.

Figure 5:
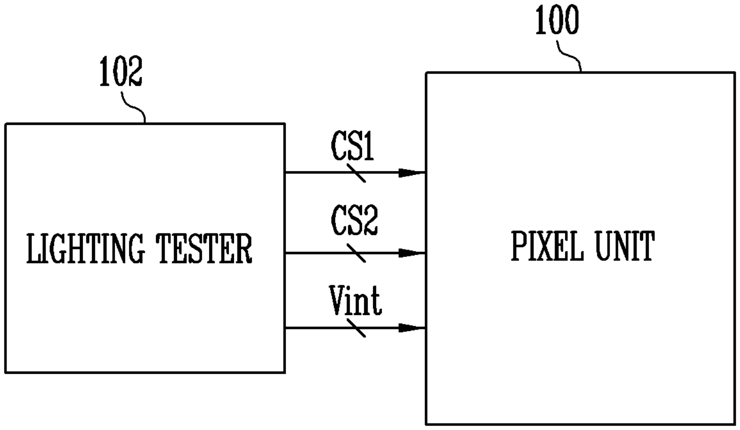
FIG. 5 is a block diagram schematically illustrating an example of a configuration used for lighting inspection of the display device of FIG. 1.

FIG. 5 is a block diagram schematically illustrating an example of a configuration used for lighting inspection of the display device of FIG. 1.

Referring to FIGS. 1, 3 and 5, when the lighting inspection of the pixels PX (refer to FIG. 1) is performed, the pixel unit 100 included in the display device 1000 may be controlled by a lighting tester 102.

According to some example embodiments, the lighting tester 102 may be connected to the pixel unit 100 when inspecting the display device 1000 in a motherboard state. According to some example embodiments, the lighting tester 102 may be connected to the pixel unit 100 by a user command or the like when the display device 1000 is used.

The lighting tester 102 may be included in the display device 1000 or may be connected to the pixel unit 100 from outside of the display device 1000. Alternatively, some components of the lighting tester 102 may be included in the display device 1000.

Referring to FIGS. 3 and 5, the lighting tester 102 may be connected to the control line CLi and the inspection control line CCLi of the pixel 10. Also, the lighting tester 102 may be connected to the scan line SLi and the sensing line SSLj of the pixel 10.

The lighting tester 102 may supply a first control signal CS1 to the control line CLi and a second control signal CS2 to the inspection control line CCLi. In addition, the lighting tester 102 may supply the voltage of the initialization power source Vint to the sensing line SSLj and supply the scan signal to the scan line SLi. Accordingly, the lighting inspection and a connection failure inspection for the light emitting elements LD1 and LD2 may be performed.

According to some example embodiments, first, all of the pixels PX (refer to FIG. 1) included in the pixel unit 100 may emit light. The lighting tester 102 may determine a pixel represented by a dark point as a defective pixel through the lighting inspection that analyzes luminance of the pixels PX (refer to FIG. 1). For example, the lighting tester 102 may detect the luminance of each of the pixels PX (refer to FIG. 1) using a camera. Alternatively, the lighting inspection may be performed including analysis of input/output values of the signals for inspection, analysis of luminance and/or color coordinates of the light emitted from the pixels PX (refer to FIG. 1), and the like. Such lighting inspection may be performed by various known methods.

Subsequently, a driving for checking connection failures of the light emitting elements (for example, LD1 and LD2 shown in FIG. 3) may be performed on the defective pixel represented by the dark point. That is, when at least one of the light emitting elements LD1 and LD2 connected in series is electrically opened or shorted, the at least one may be displayed darker than a normally connected pixel. After such the defective pixel is specified, among the light emitting elements LD1 and LD2 connected in series, at least one light emitting element checked as a connection failure may be detected by using a bypass between the light emitting elements LD1 and LD2.

A method and pixel structure for detecting the connection failures of the light emitting elements LD1 and LD2 will be described in detail with reference to FIG. 6A and the like.

Figure 6A:
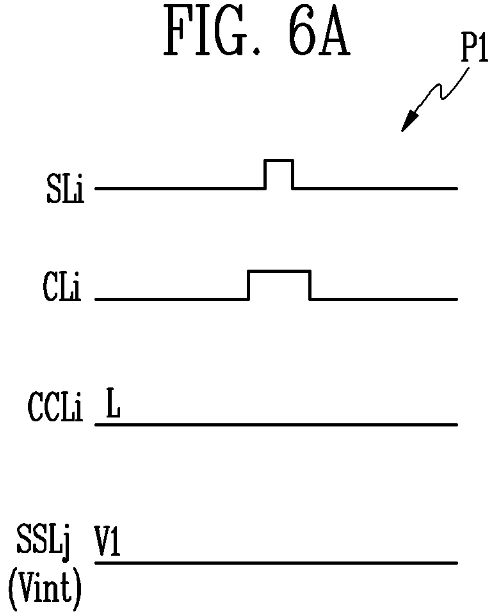
FIGS. 6A and 6B are timing diagrams for explaining an inspection method of a display device.
Figure 6B:
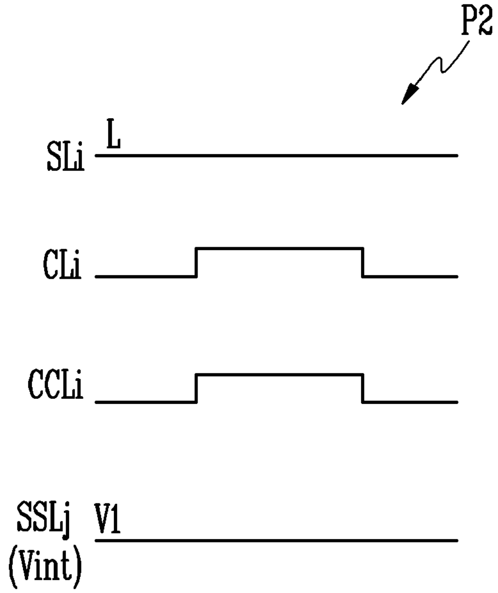

FIGS. 6A and 6B are timing diagrams for explaining an inspection method of a display device.

Referring to FIGS. 3, 6A and 6B, an inspection method of a display device may include a first period P1 for determining the defective pixel and a second period P2 for checking the connection failures of the first and second light emitting elements LD1 and LD2.

In FIGS. 6A and 6B, the driving of the pixel 10 of FIG. 3 will be mainly described, and the driving may also be applied to a plurality of pixels.

As shown in FIG. 6A, in the first period P1, the scan signal of a gate-on level is supplied to the scan line SLi, and the first control signal of a gate-on level is supplied to the control line CLi. In the first period P1, the second control signal may not be supplied. For example, the second control signal of a gate-off level (for example, indicated by L) may be supplied to the inspection control line CCLi during the first period P1.

In addition, the initialization power source Vint having a first voltage level V1 may be supplied through the sensing line SSLj. The initialization power source Vint may be supplied to stably calculate the driving current generated by the third transistor T3 by maintaining the voltage of the second node N2 at a constant value.

According to some example embodiments, the first voltage level V1 may be higher than a voltage level of the second power source VSS. For example, a difference between the first voltage level V1 and the voltage level of the second power source VSS may be equal to or greater than the sum of a threshold voltage of the first light emitting element LD1 and a threshold voltage of the second light emitting element LD2.

Because an operation of the pixel 10 in FIG. 6A is substantially the same as the operation of the display period DP described with reference to FIG. 4, some duplicate descriptions may be omitted.

When the dark point is generated in the pixel 10 or the luminance of the pixel is lower than that of other pixels, an operation for checking the connection failures of the light emitting elements LD1 and LD2 of the pixel 10 may be performed during the second period P2.

In the second period P2, supply of the scan signal to the scan line SLi may be stopped. For example, the scan signal of a gate-off level (for example, indicated by L) may be supplied. Accordingly, the fourth transistor T4 may maintain a turn-off state in the second period P2.

In addition, in the second period P2, the first control signal may be supplied to the control line CLi, and the second control signal may be supplied to the inspection control line CCLi. Accordingly, the first transistor T1 and the second transistor T2 may be turned on at the same time. The initialization power source Vint of the first voltage level V1 may be supplied to the sensing line SSLj.

Accordingly, in the second period P2, a current path connected from the sensing line SSLj to the second power source VSS through the second node N2, the first light emitting element LD1, the third node N3, and the second transistor T2 may be formed. When the first light emitting element LD1 is normally connected or aligned between the second node N2 and the third node N3, the first light emitting element LD1 may emit light due to a voltage difference between the first voltage level V1 of the initialization power source Vint and the voltage level of the second power source VSS.

In other words, when the pixel 10 emits light, it may be determined that a connection of the first light emitting element LD1 is normal. At this time, because the pixel 10 is displayed darker than other pixels, it may be determined (or inferred) that a connection of the first light emitting element LD1 is abnormal.

When the pixel 10 does not emit light in the second period P2, it may be determined that the connection of the first light emitting element LD1 is abnormal. For example, the first light emitting element LD1 may be electrically opened, or an unintended short circuit may be generated between the second node N2 and the third node N3. The result of checking the connection failures of the light emitting elements LD1 and LD2 may be stored in a memory or the like. For example, the coordinates of the defective pixel, the position of the light emitting element in which the connection failure has occurred, and the like may be recorded in a storage medium such as the memory at the same time as the second period P2 or after the second period P2.

A repair process, a repair driving, a bypass process, a bypass driving, and the like may be additionally performed on the abnormally connected light emitting element in various known methods.

As described above, the display device 1000 (refer to FIG. 1) including the pixel 10 according to the embodiments of the present invention and the driving method thereof may relatively accurately detect the light emitting element in which the connection failure has occurred using the transistor (for example, the second transistor T2) connected between the light emitting elements LD1 and LD2 connected in series, and the second control signal supplied to the inspection control line for controlling the same. Accordingly, repair or compensation driving may be easily performed later. Therefore, reliability of the display device 1000 (refer to FIG. 1) including the plurality of light emitting elements LD1 and LD2 connected in series may be improved.

Figure 7:
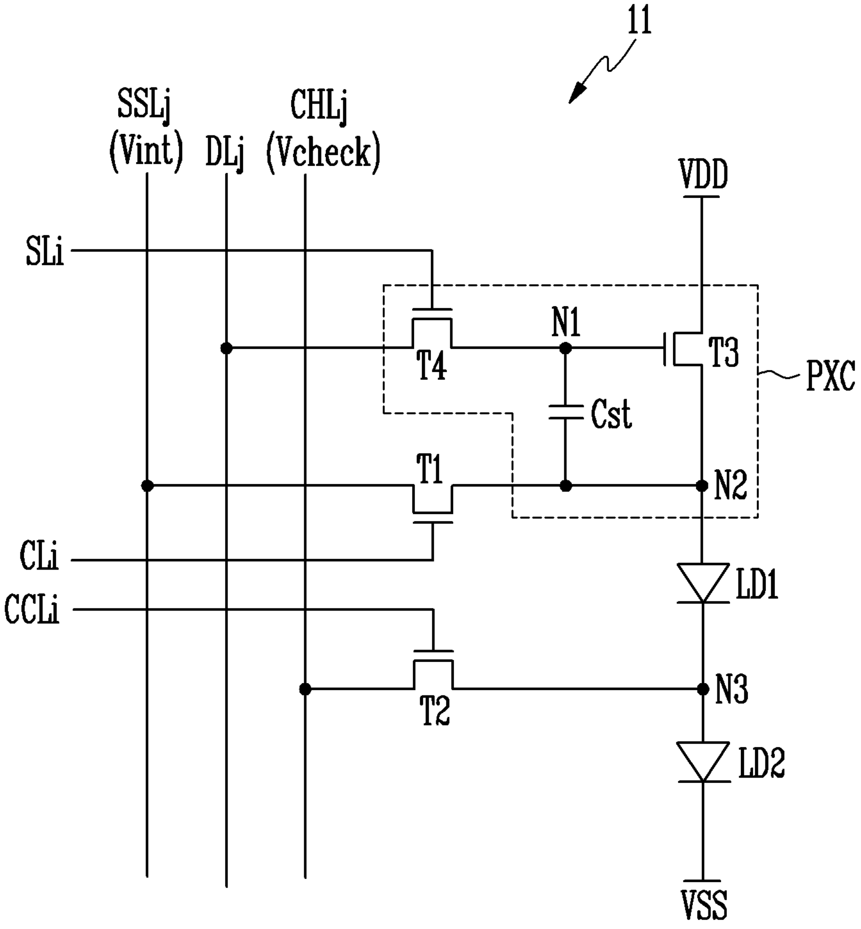
FIG. 7 is a circuit diagram illustrating another example of the pixel included in the display device of FIG. 1.

FIG. 7 is a circuit diagram illustrating another example of the pixel included in the display device of FIG. 1.

In FIG. 7, the same reference numerals are used for the components described with reference to FIG. 3, and some duplicate descriptions of these components may be omitted. In addition, a pixel 11 of FIG. 7 may have a configuration substantially the same as or similar to the pixel 10 of FIG. 3 except for a connection of the second transistor T2.

Referring to FIG. 7, the pixel 11 may include the plurality of light emitting elements LD1 and LD2, the first transistor T1, the second transistor T2, the third transistor T3 (the driving transistor), the storage capacitor Cst, and the fourth transistor T4. The pixel 11 may be connected to an inspection power source line CHLj supplying a lighting inspection power source Vcheck.

The light emitting elements LD1 and LD2 may include the first light emitting element LD1 and the second light emitting element LD2 connected in series.

According to some example embodiments, the first electrode of the second transistor T2 may be connected to the third node N3, and the second electrode of the second transistor T2 may be connected to the inspection power source line CHLj. The gate electrode of the second transistor T2 may be connected to the inspection control line CCLi.

When checking the connection failure of the first light emitting element LD1, a voltage level of the lighting inspection power source Vcheck may be lower than the voltage level of the initialization power source Vint so that the first light emitting element LD1 emits light. In addition, the voltage level of the lighting inspection power source Vcheck may be equal to or less than the voltage level of the second power source VSS so that the second light emitting element LD2 does not emit light.

When checking the connection failure of the second light emitting element LD2, the voltage level of the lighting inspection power source Vcheck may be equal to or greater than the voltage level of the initialization power source Vint so that the first light emitting element LD1 does not emit light. In addition, the voltage level of the lighting inspection power source Vcheck may be greater than the voltage level of the second power source VSS so that the second light emitting element LD2 emits light.

Figure 8:
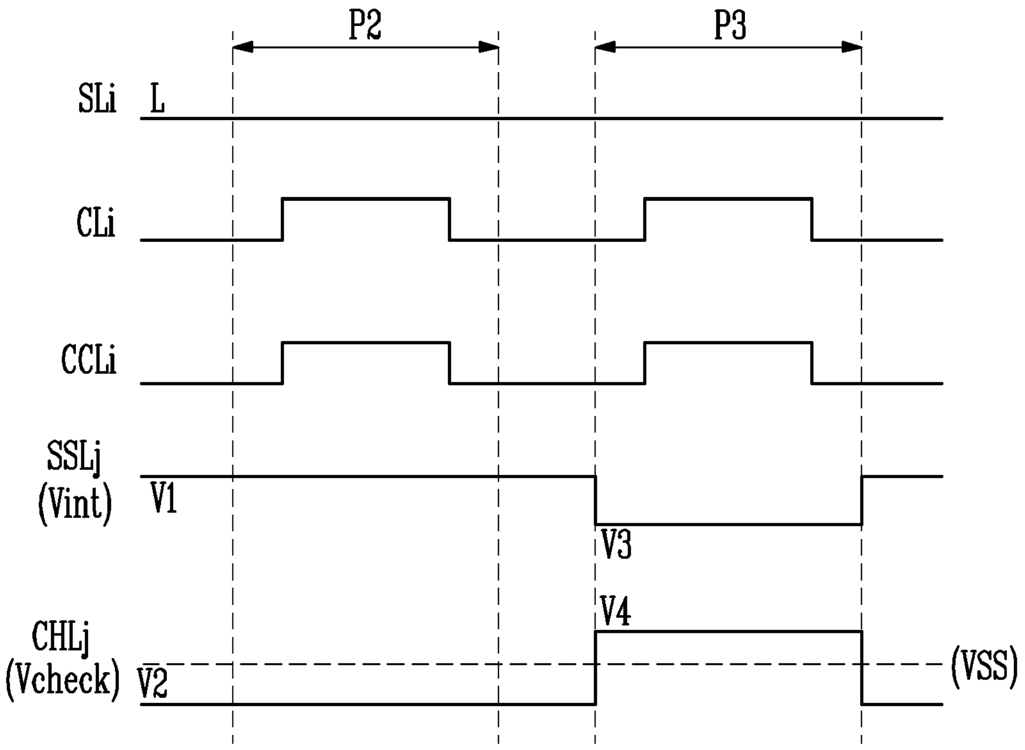
FIG. 8 is a timing diagram for explaining an example of an inspection method of the display device including the pixel of FIG. 7.

FIG. 8 is a timing diagram for explaining an example of an inspection method of the display device including the pixel of FIG. 7.

In FIG. 8, the same reference numerals are used for the components described with reference to FIG. 6B, and some duplicate descriptions of these components may be omitted.

Referring to FIGS. 7 and 8, an inspection method of the display device may include a second period P2 for checking the connection failure of the first light emitting element LD1 and a third period P3 for checking the connection failure of the second light emitting element LD2.

According to some example embodiments, the same signal may be supplied to the control line CLi and the inspection control line CCLi. For example, a control signal output from one control signal source may be simultaneously supplied to the control line CLi and the inspection control line CCLi. However, this is an example, and a method for providing the signal to the control line CLi and the inspection control line CCLi is not limited thereto.

In the second period P2, the first transistor T1 and the second transistor T2 may be turned on in response to the first control signal supplied to the control line CLi and the second control signal supplied to the inspection control line CCLi. At this time, the fourth transistor T4 may be turned off.

In the second period P2, the initialization power source Vint may have the first voltage level V1, and the lighting inspection power source Vcheck may have the second voltage level V2. The first voltage level V1 may be set higher than the second voltage level V2 so that the first light emitting element LD1 emits light. In addition, the second voltage level V2 may be set lower than the voltage level of the second power source VSS so that the second light emitting element LD2 does not emit light.

Accordingly, in the second period P2, a current path connected from the sensing line SSLj to the inspection power source line CHLj through the second node N2, the first light emitting element LD1, the third node N3, and the second transistor T2 may be formed.

When the pixel 11 emits light, it may be determined that the connection of the first light emitting element LD1 is normal. However, when the pixel 11 does not emit light, it may be determined that the connection of the first light emitting element LD1 is abnormal (shorted or opened).

In the third period P3, the first transistor T1 and the second transistor T2 may be turned on in response to the first control signal supplied to the control line CLi and the second control signal supplied to the inspection control line CCLi. At this time, the fourth transistor T4 may be turned off.

In the third period P3, the initialization power source Vint may have a third voltage level V3, and the lighting inspection power source Vcheck may have a fourth voltage level V4. The fourth voltage level V4 may be set higher than the voltage level of the second power source VSS so that the second light emitting element LD2 emits light. In addition, the third voltage level V3 may be set to be lower than or equal to the fourth voltage level V4 so that the first light emitting element LD1 does not emit light.

Accordingly, in the third period P3, a current path connected from the inspection power source line CHLj to the second power source VSS through the third node N3 and the second light emitting element LD2 may be formed.

In the third period P3, when the pixel 11 emits light, it may be determined that the connection of the second light emitting element LD2 is normal. However, when the pixel 11 does not emit light, it may be determined that the connection of the second light emitting element LD2 is abnormal (shorted or opened).

In FIG. 8, the second period P2 and the third period P3 are driven at intervals (e.g., set or predetermined intervals). However, only one of the second period P2 and the third period P3 may be driven in some cases.

As described above, the pixel 11 of FIG. 7 and the inspection method of FIG. 8 for driving the pixel 11 may individually check (and inspect) the connection failure (or conduction) of each of the first light emitting element LD1 and the second light emitting element LD2. Therefore, accuracy may be further improved to detect the light emitting element in which the connection failure has occurred.

Figure 9:
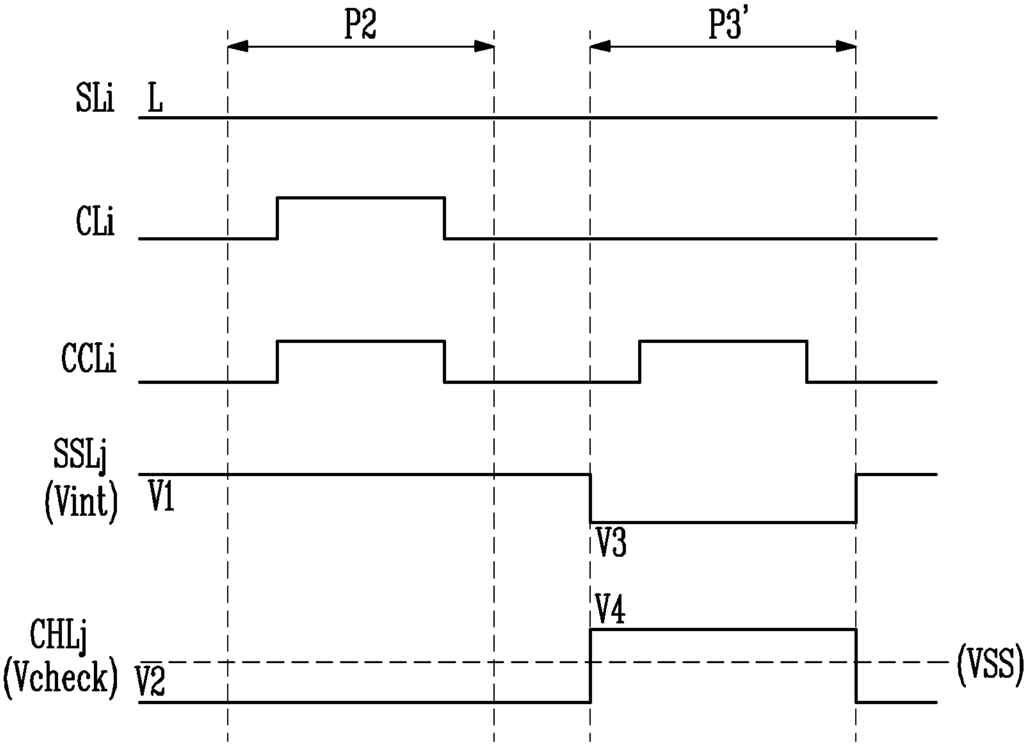
FIG. 9 is a timing diagram for explaining another example of an inspection method of the display device including the pixel of FIG. 7.

FIG. 9 is a timing diagram for explaining another example of an inspection method of the display device including the pixel of FIG. 7.

In FIG. 9, the same reference numerals are used for the components described with reference to FIG. 8, and some duplicate descriptions of these components may be omitted. In addition, an inspection method of FIG. 9 may be substantially the same or similar to the inspection method of FIG. 8 except for a waveform of the first control signal supplied in a third period P3'.

Referring to FIGS. 7 and 9, the inspection method of the display device may include a second period P2 for checking the connection failure of the first light emitting element LD1 and the third period P3' for checking the connection failure of the second light emitting element LD2.

In the third period P3', the first control signal may not be supplied to the control line CLi, and the first transistor T1 may be turned off. Whether the second light emitting element LD2 emits light may be detected in the third period P3'. Therefore, the first transistor T1 may be turned off to reduce power consumption.

Figure 10:
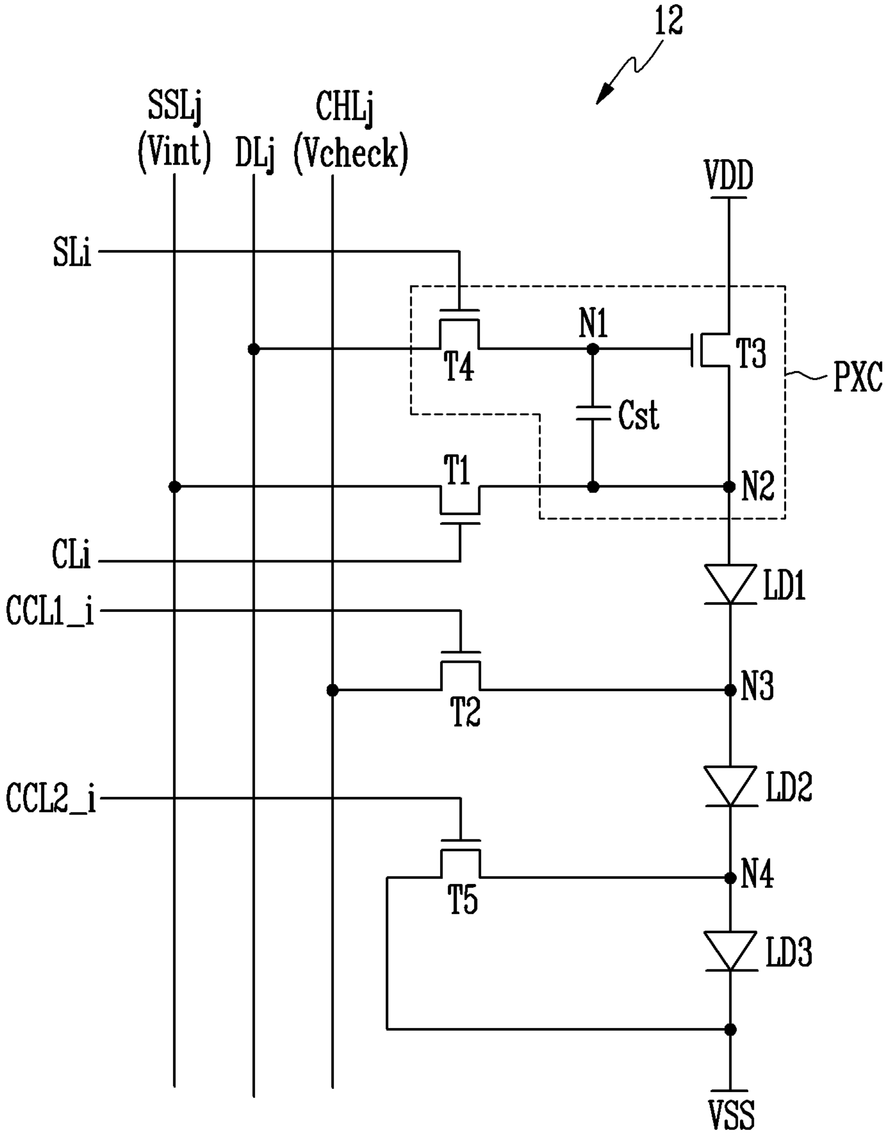
FIG. 10 is a circuit diagram illustrating another example of the pixel included in the display device of FIG. 1.

FIG. 10 is a circuit diagram illustrating another example of the pixel included in the display device of FIG. 1.

In FIG. 10, the same reference numerals are used for the components described with reference to FIG. 7, and some duplicate description of these components may be omitted. In addition, a pixel 12 of FIG. 10 may have a configuration substantially the same as or similar to the pixel 11 of FIG. 7 except for a third light emitting element LD3 and a fifth transistor T5.

Referring to FIG. 10, the pixel 12 may include the plurality of light emitting elements LD1, LD2, and LD3, the first transistor T1, the second transistor T2, the third transistor T3, the storage capacitor Cst, the fourth transistor T4, and the fifth transistor T5. The pixel 12 may be connected to the inspection power source line CHLj supplying the lighting inspection power source Vcheck.

The third light emitting element LD3 may be electrically connected between the second light emitting element LD2 and the second power source VSS. That is, the first to third light emitting elements LD1, LD2, and LD3 may be connected in series.

The gate electrode of the second transistor T2 may be connected to a first inspection control line CCL1_*i*. The second control signal may be supplied to the first inspection control line CCL1_*i*.

A first electrode of the fifth transistor T5 may be connected to a fourth node N4 between the second light emitting element LD2 and the third light emitting element LD3, and a second electrode of the fifth transistor T5 may be connected to the second power source VSS. A gate electrode of the fifth transistor T5 may be connected to a second inspection control line CCL2_*i*. A third control signal may be supplied to the second inspection control line CCL2_*i*.

The fifth transistor T5 may be turned on when the third control signal is supplied to the second inspection control line CCL2_*i* to form a bypass between the fourth node N4 and the second power source VSS. The fifth transistor T5 may be used to inspect (and check) a connection state of the third light emitting element LD3.

The pixel 12 may further include at least one light emitting diode connected in series and at least one transistor corresponding thereto to form a bypass.

Figure 11:
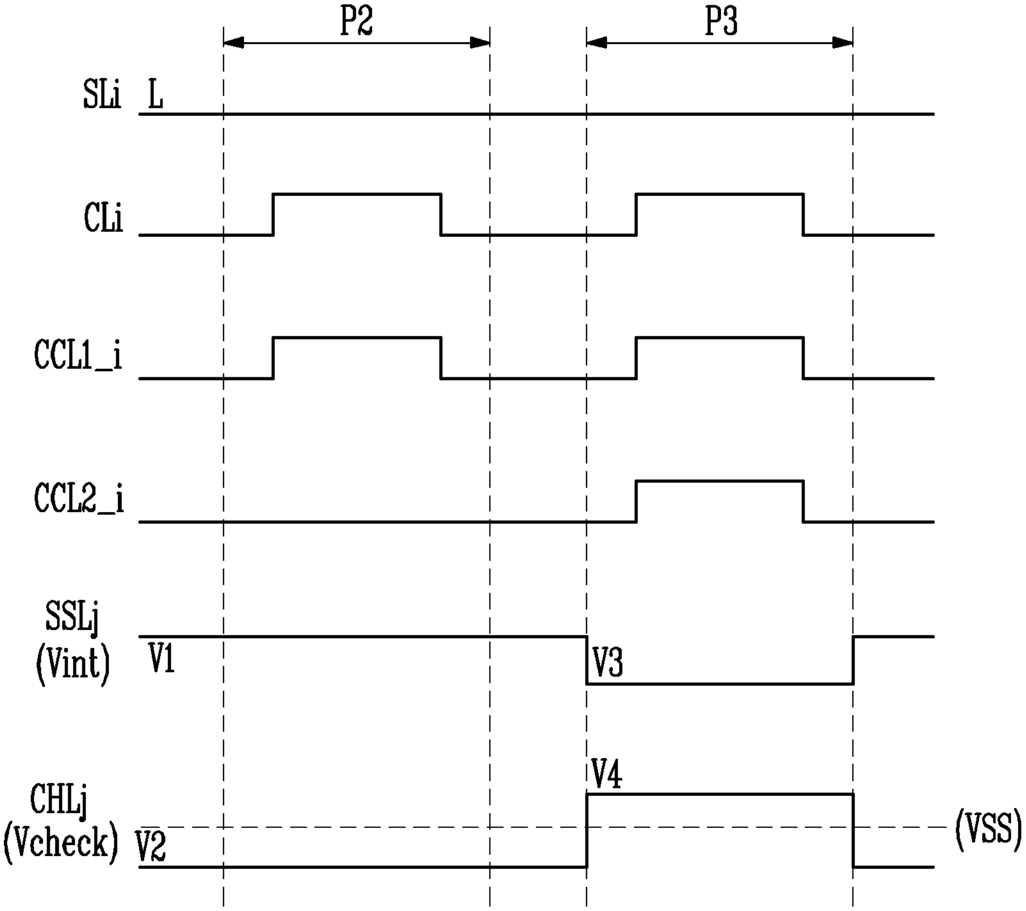
FIG. 11 is a timing diagram for explaining an example of an inspection method of the display device including the pixel of FIG. 10.

FIG. 11 is a timing diagram for explaining an example of an inspection method of the display device including the pixel of FIG. 10.

In FIG. 11, the same reference numerals are used for the components described with reference to FIGS. 6B and 8, and some duplicate descriptions of these components may be omitted.

Referring to FIGS. 10 and 11, an inspection method of the display device may include a second period P2 for checking the connection failure of the first light emitting element LD1, and a third period P3 for checking the connection failures of the second light emitting element LD2 and the third light emitting element LD3.

According to some example embodiments, a driving method for inspection in the second period P2 is substantially the same as the driving method in the second period P2 described with reference to FIGS. 8 and 9 except for a configuration in which the fifth transistor T5 is turned off. For example, in the second period P2, the third control signal may not be supplied, and the fifth transistor T5 may be turned off. Because the second voltage level V2 of a voltage (that is, the lighting inspection power source Vcheck) of the third node N3 is lower than the voltage level of the second power source VSS, the connection failure of the first light emitting element LD1 may be checked.

In the second period P2, the first and second transistors T1 and T2 may be turned on, and a current path connected from the sensing line SSLj to the inspection power source line CHLj through the second node N2, the first light emitting element LD1, the third node N3, and the second transistor T2 may be formed. Accordingly, whether the first light emitting element LD1 is normally connected may be determined. Because the lighting inspection power source Vcheck of the second voltage level V2 lower than the voltage level of the second power source VSS is supplied to the third node N3, the second and third light emitting elements LD2 and LD3 may not emit light.

In the third period P3, the first transistor T1, the second transistor T2, and the fifth transistor T5 may be turned on in response to the first control signal supplied to the control line CLi, the second control signal supplied to the first inspection control line CCL1_i, and the third control signal supplied to the second inspection control line CCL2_i. In the third period P3, the initialization power source Vint may have the third voltage level V3, and the lighting inspection power source Vcheck may have the fourth voltage level V4. Accordingly, in the third period P3, a current path connected from the inspection power source line CHLj to the second power source VSS through the second light emitting element LD2 and the fifth transistor T5 may be formed.

After the pixel 12 is a defective pixel and the normal connection of the first light emitting element LD1 is checked in the second period P2, the third period P3 may proceed. When the pixel 12 emits light in the third period P3, it may be determined that the connection of the second light emitting element LD2 is normal and a connection of the third light emitting element LD3 is abnormal.

However, after the pixel is determined to be the defective pixel, when the pixel 12 does not emit light in the third period P3, it may be determined that the connection of the second light emitting element LD2 is abnormal (shorted or opened).

Figure 12:
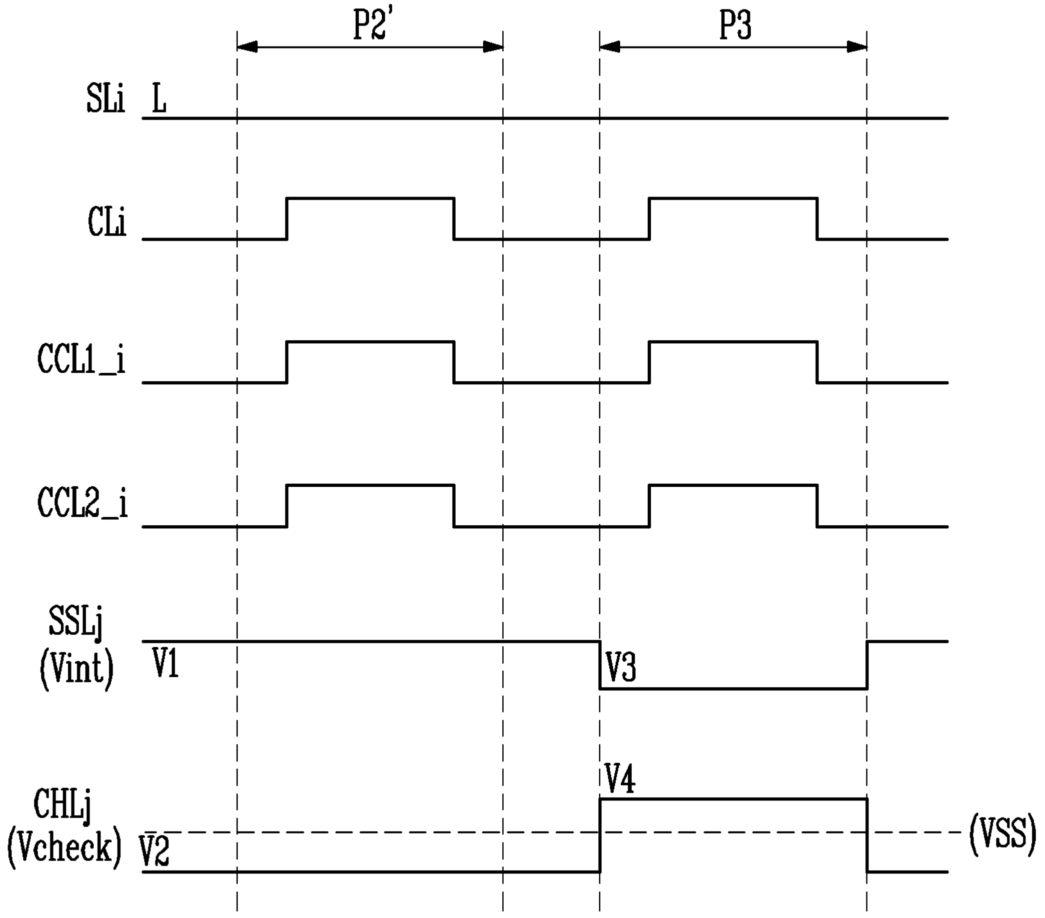
FIG. 12 is a timing diagram for explaining another example of an inspection method of the display device including the pixel of FIG. 10.

FIG. 12 is a timing diagram for explaining another example of an inspection method of the display device including the pixel of FIG. 10.

In FIG. 12, the same reference numerals are used for the components described with reference to FIG. 11, and some duplicate descriptions of these components may be omitted. In addition, an inspection method of FIG. 12 may be substantially the same or similar to the inspection method of FIG. 11 except for a waveform of the third control signal supplied in a second period P2'.

Referring to FIGS. 10 and 12, the inspection method of the display device may include the second period P2' for checking the connection failure of the first light emitting element LD1 and a third period P3 for checking the connection failure of the second light emitting element LD2.

In the second period P2', the third control signal may be supplied, and the first, second, and fifth transistors T1, T2, and T5 may all be turned on. At this time, because the lighting inspection power source Vcheck of the second voltage level V2 lower than the voltage level of the second power source VSS is supplied to the third node N3, the second and third light emitting elements LD2 and LD3 may not emit light. In addition, a current path connected from the sensing line SSLj to the inspection power source line CHLj through the second node N2, the first light emitting element LD1, the third node N3, and the second transistor T2 may be formed. When the first light emitting element LD1 is normally connected, the first light emitting element LD1 may emit light.

Because an operation in the third period P3 is substantially the same as the operation in the third period P3 described with reference to FIG. 11, some duplicate descriptions may be omitted.

According to some example embodiments, the same signal (control signal) may be supplied to at least two of the control line CLi, the first inspection control line CCL1_i, and the second inspection control line CCL2_i.

Figure 13:
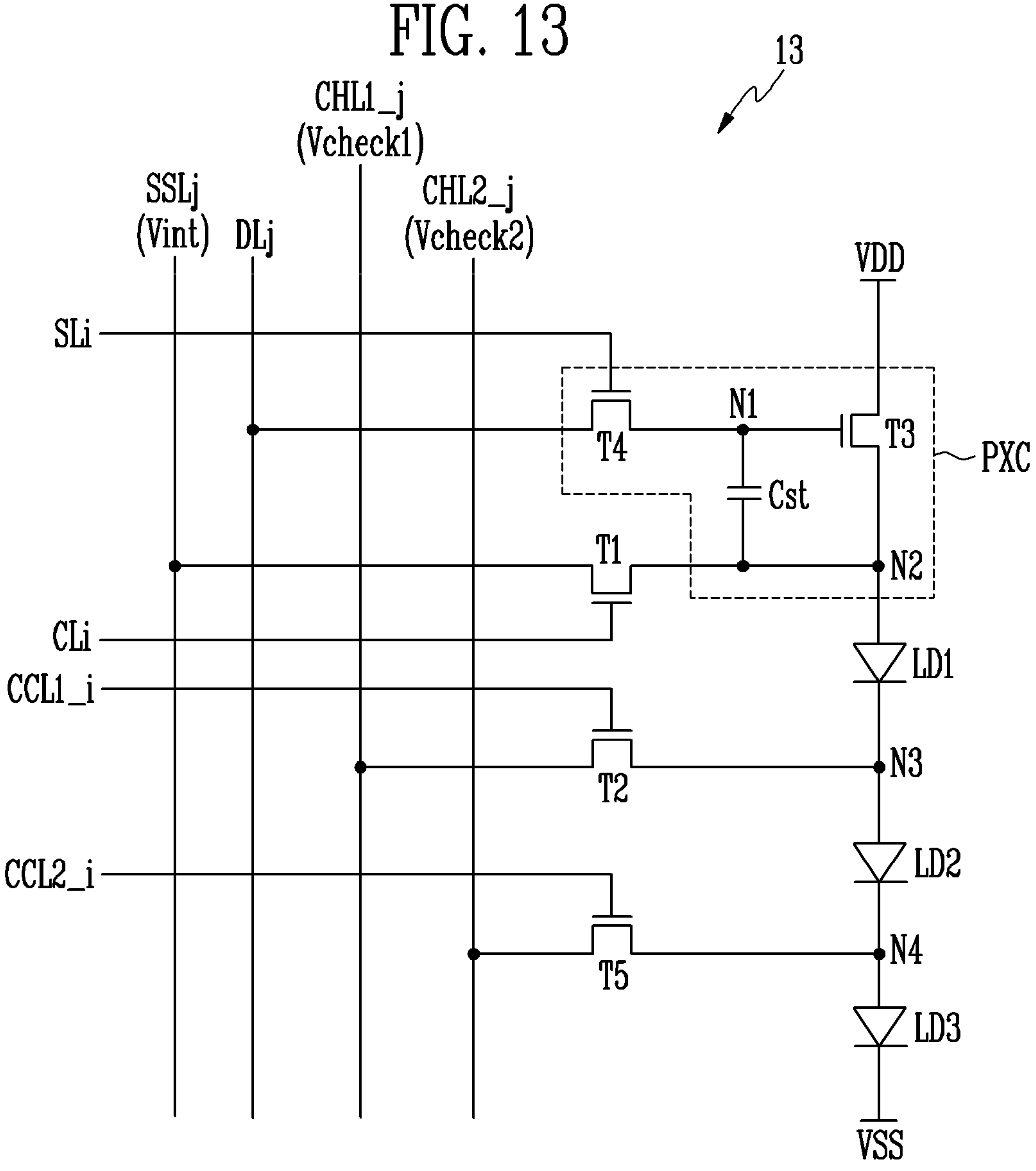
FIG. 13 is a circuit diagram illustrating still another example of the pixel included in the display device of FIG. 1.

FIG. 13 is a circuit diagram illustrating still another example of the pixel included in the display device of FIG. 1.

In FIG. 13, the same reference numerals are used for the components described with reference to FIG. 10, and some duplicate descriptions of these components may be omitted. In addition, a pixel 13 of FIG. 13 may have a configuration substantially the same as or similar to the pixel 12 of FIG. 10 except for a connection of the fifth transistor T5.

Referring to FIG. 13, the pixel 13 may include the plurality of light emitting elements LD1, LD2, and LD3, the first transistor T1, the second transistor T2, the third transistor T3, the storage capacitor Cst, the fourth transistor T4, and the fifth transistor T5. The pixel 13 may be connected to a second inspection power source line CHL2_j supplying a second lighting inspection power source Vcheck2 (or an additional lighting inspection power source).

According to some example embodiments, the first electrode of the second transistor T2 may be connected to the third node N3. The second electrode of the second transistor T2 may be connected to a first inspection power source line CHL1_j supplying a first lighting inspection power source Vcheck1. The gate electrode of the second transistor T2 may be connected to the first inspection control line CCL1_i supplying the second control signal.

The first electrode of the fifth transistor T5 may be connected to the fourth node N4. The second electrode of the fifth transistor T5 may be connected to the second inspection power source line CHL2J. The gate electrode of the fifth transistor T5 may be connected to the second inspection control line CCL2_i supplying the third control signal. The fifth transistor T5 may be used to inspect (and check) a connection state of the third light emitting element LD3.

When checking the connection failure of the second light emitting element LD2, a voltage level of the first lighting inspection power source Vcheck1 may be equal to or higher than the voltage level of the initializing power source Vint so that the first light emitting element LD1 does not emit light. The voltage level of the first lighting inspection power source Vcheck1 may be greater than the voltage level of the second power source VSS so that the second light emitting element LD2 emits light. Also, a voltage level of the second lighting inspection power source Vcheck2 may be smaller than the voltage level of the second power source VSS so that the third light emitting element LD3 does not emit light.

When checking the connection failure of the third light emitting element LD3, the voltage level of the first lighting inspection power source Vcheck1 may be equal to or higher than the voltage level of the initializing power source Vint so that the first light emitting element LD1 does not emit light. The voltage level of the first lighting inspection power source Vcheck1 may be smaller than the voltage level of the second lighting inspection power source Vcheck2 so that the second light emitting element LD2 does not emit light. Also, the voltage level of the second lighting inspection power source Vcheck2 may be greater than the voltage level of the second power source VSS so that the third light emitting element LD3 emits light.

Figure 14:
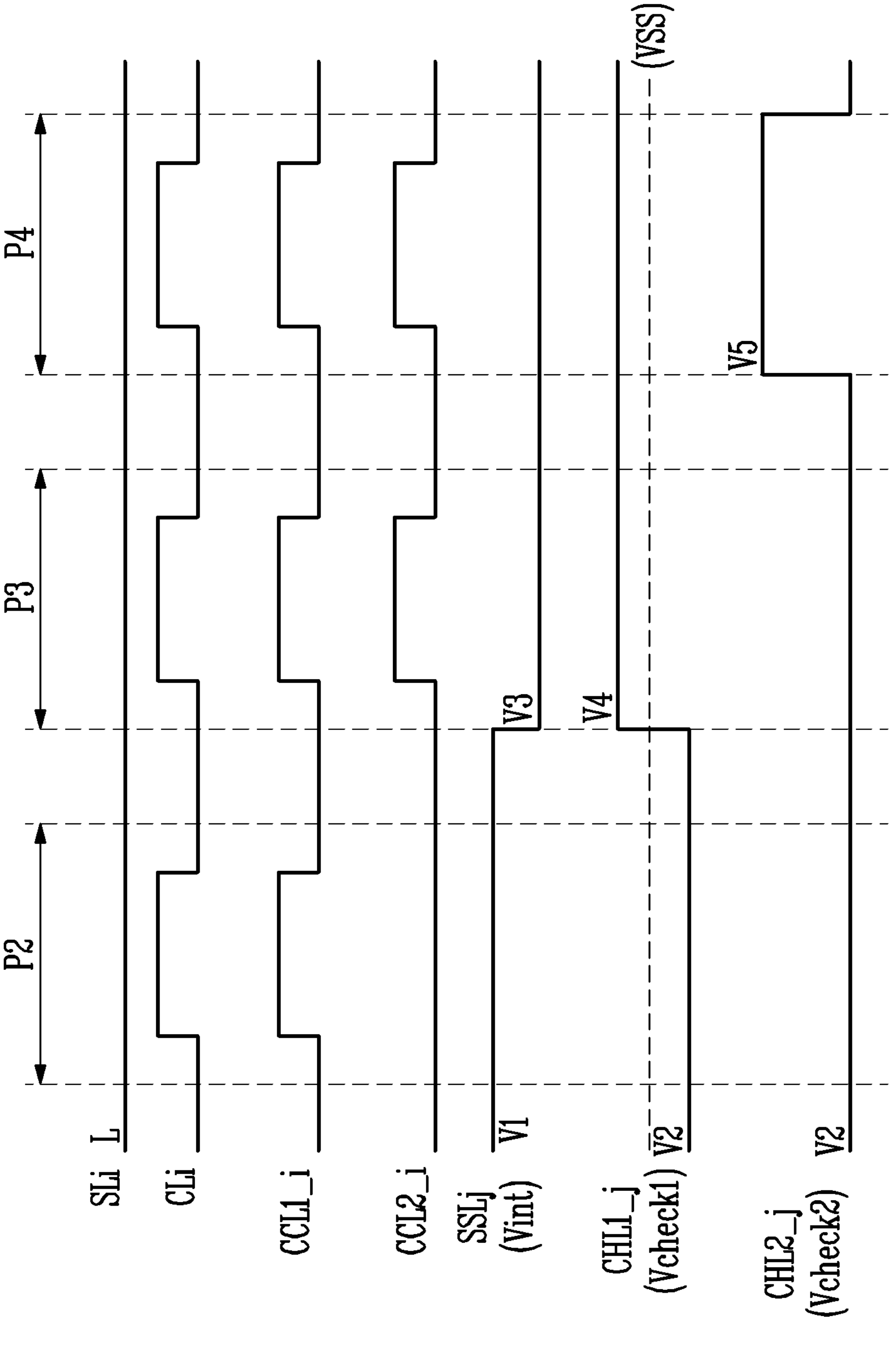
FIG. 14 is a timing diagram for explaining an example of an inspection method of the display device including the pixel of FIG. 13.

FIG. 14 is a timing diagram for explaining an example of an inspection method of the display device including the pixel of FIG. 13.

In FIG. 14, the same reference numerals are used for components described with reference to FIGS. 6B, 8, and 11, and some duplicate descriptions of these components may be omitted.

Referring to FIGS. 13 and 14, an inspection method of the display device may include a second period P2 for checking the connection failure of the first light emitting element LD1, a third period P3 for checking the connection failure of the second light emitting element LD2, and a fourth period P4 for checking the connection failure of the light emitting element LD3.

According to some example embodiments, in the second period P2 and the third period P3, the second lighting inspection power source Vcheck2 may have the second voltage level V2. Therefore, the third light emitting element LD3 does not emit light in the second period P2 and the third period P3.

In the fourth period P4, the initialization power source Vint of the third voltage level V3 may be supplied to the sensing line SSLj, the first lighting inspection power source Vcheck1 of the fourth voltage level V4 may be supplied to the first inspection power source line CHL1_*j*, and the second lighting inspection power source Vcheck2 of a fifth voltage level V5 higher than the fourth voltage level V4 may be supplied to the second inspection power source line CHL2J.

In the fourth period P4, the first transistor T1, the second transistor T2, and the fifth transistor T5 may all be turned on. Because a voltage of the third node N3 is higher than the voltage of the second node N2, the first light emitting element LD1 may be turned off. Also, because a voltage of the fourth node N4 is higher than the voltage of the third node N3, the second light emitting element LD2 may be turned off.

Accordingly, in the fourth period P4, a current path connected from the second inspection power source line CHL2J to the second power source VSS through the fifth transistor T5 and the third light emitting element LD3 may be formed.

In the fourth period P4, when the pixel 13 emits light, it may be determined that the connection of the third light emitting element LD3 is normal. However, when the pixel 13 does not emit light, it may be determined that the connection of the third light emitting element LD3 is abnormal (shorted or opened).

Accordingly, even when three or more light emitting elements are connected in series, the connection failure of each of the light emitting elements may be checked. In FIG. 13, three light emitting elements are connected in series, but embodiments according to the present invention are not limited thereto. Even when four or more light emitting elements are connected in series, the contents described with reference to FIGS. 10 to 14 may be applied, and the connection failure of each of the light emitting elements may be checked.

As described above, the display device and the inspection method thereof according to the embodiments of the present invention may relatively accurately detect the connection failure of each of the light emitting elements using the transistor connected between the light emitting elements connected in series, and the control signal supplied to the inspection control line for controlling the same. Accordingly, the repair or compensation driving may be easily performed later. Therefore, reliability and image quality of the display device including the plurality of light emitting elements connected in series may be improved.

Figure 15:
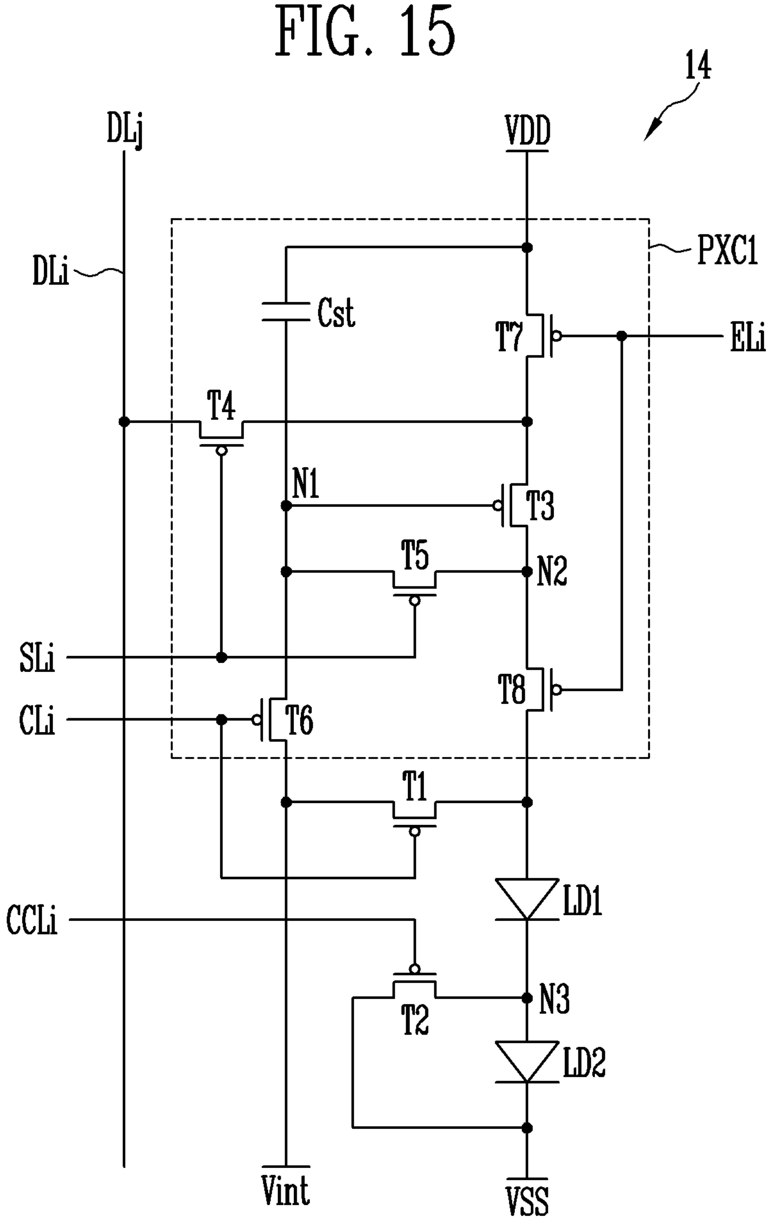
FIG. 15 is a circuit diagram illustrating an example of a pixel included in a display device according to some example embodiments of the present invention.

FIG. 15 is a circuit diagram illustrating an example of a pixel included in a display device according to embodiments of the present invention.

In FIG. 15, the same reference numerals are used for the components described with reference to FIG. 3, and some duplicate descriptions of these components may be omitted. In addition, a pixel 14 of FIG. 15 may have a configuration substantially the same as or similar to the pixel 10 of FIG. 3 except for a configuration of a pixel circuit PXC1.

Referring to FIG. 15, the pixel 14 may include a pixel circuit PXC1, the first transistor T1, the second transistor T2, the first light emitting element LD1, and the second light emitting element LD2.

According to some example embodiments, the pixel 14 may compensate for a threshold voltage of the third transistor T3 (the driving transistor) through the pixel circuit PXC1.

Because the connections and operations of the first transistor T1 and the second transistor T2 have been described with reference to FIG. 3 and the like, some duplicate descriptions may be omitted.

The pixel circuit PXC1 may include third to eighth transistors T3 to T8.

The third transistor T3 (the driving transistor) may control the current flowing from the first power source VDD to the second node N2 in response to the voltage of the first node N1.

The fourth transistor T4 may be connected between the data line DLj and the first electrode of the third transistor T3. The gate electrode of the fourth transistor T4 may be connected to the scan line SLi. The fourth transistor T4 may be turned on by the scan signal to transfer the data signal from the data line DLj to the first electrode of the third transistor T3.

The fifth transistor T5 may be connected between the first node N1 and the second node N2. The gate electrode of the fifth transistor T5 may be connected to the scan line SLi. The third transistor T3 may be diode-connected by turning on the fifth transistor T5. A voltage corresponding to a difference between the data signal and the threshold voltage of the third transistor T3 may be supplied to the second node N2.

The sixth transistor T6 may be connected between the first node N1 and a wiring to which the initialization power source Vint is supplied. A gate electrode of the sixth transistor T6 may be connected to the control line CLi. When the sixth transistor T6 is turned on, the voltage of the initialization power source Vint may be supplied to the first node N1. The seventh transistor T7 may be connected between the first power source VDD and the first electrode of the third transistor T3, and the eighth transistor T8 may be connected between the second node N2 and the first electrode of the first light emitting element LD1. Gate electrodes of the seventh transistor T7 and the eighth transistor T8 may be connected to an emission control line ELi. When the seventh and eighth transistors T7 and T8 are turned on, the first and second light emitting elements LD1 and LD2 may emit light based on the driving current.

As such, the pixel circuit PXC1 may be implemented with various known structures, or structures for emitting light the light emitting elements LD1 and LD2.

The display device and the inspection method thereof according to the embodiments of the present invention may relatively accurately detect the connection failure of each of the light emitting elements using the transistor connected between the light emitting elements connected in series, and the control signal supplied to the inspection control line for controlling the same. Accordingly, the repair or compensation driving may be easily performed later. Therefore, reliability and image quality of the display device including the plurality of light emitting elements connected in series may be improved.

However, effects and characteristics of embodiments according to the present invention are not limited to the above-described effects, and may be variously extended without departing from the spirit and scope of the present invention.

As described above, aspects of some example embodiments of the present invention have been described with reference to the drawings. However, those skilled in the art will appreciate that various modifications and changes can be made to the example embodiments according to the present invention without departing from the spirit and scope of the invention as set forth in the appended claims and their equivalents.

What is claimed is:

1. An inspection method of a display device, the inspection method comprising:

checking connection failures of light emitting elements included in a pixel and connected in series based on a first control signal, a second control signal, and a voltage of an initialization power source, wherein the pixel comprises:

a pixel circuit controlling a current flowing from a first power source to a second node in response to a voltage of a first node;

a first light emitting element connected to the second node;

a first transistor having a first electrode connected to the second node, a second electrode connected to a sensing line supplying the voltage of the initialization power source, and a gate electrode connected to a control line;

a second light emitting element electrically connected between the first light emitting element and a second power source; and a second transistor having a first electrode connected to a third node between the first light emitting element and the second light emitting element, a second electrode of the second transistor connected to the second power source, and a gate electrode connected to a first inspection control line, and wherein the checking the connection failures of the light emitting elements includes:

supplying the initialization power source of a first voltage level to the sensing line, and turning on the first transistor and the second transistor;

determining that a connection of the second light emitting element is abnormal during light emission by the pixel; and determining that a connection of the first light emitting element is abnormal during a period that the pixel does not emit light.

2. The inspection method of claim 1, wherein the first transistor is turned on in response to the first control signal, and the second transistor is turned on in response to the second control signal supplied to the first inspection control line.

3. The inspection method of claim 1, wherein the pixel circuit includes:

a third transistor connected between the first power source and the second node, and having a gate electrode connected to the first node;

a fourth transistor connected between the first node and a data line, and having a gate electrode connected to a scan line; and a storage capacitor connected between the first node and the second node, and wherein the gate electrode of the first transistor is connected to the control line transmitting the first control signal.

4. The inspection method of claim 3, wherein the fourth transistor is turned off during a period in which the first transistor and the second transistor are turned on.

5. The inspection method of claim 1, wherein the checking the connection failures of the light emitting elements includes:

initiating light emission by all pixels included in a pixel unit before checking the connection failures of the light emitting elements;

determining a pixel represented by a dark point to be a defective pixel by analyzing luminance of the pixels; and checking the connection failures of the light emitting elements with respect to the defective pixel.

6. A display device comprising:

a plurality of pixels connected to respective scan lines, control lines, inspection control lines, data lines, and sensing lines;

a scan driver configured to supply a scan signal to the scan lines and to supply a control signal to the control lines;

a data driver configured to supply one of an image data signal and a sensing data signal to the data lines; and a sensing circuit configured to sense characteristics of the pixels based on a sensing value supplied through the sensing lines, wherein a pixel positioned on an i-th horizontal line among the pixels, where i is a natural number, includes:

a pixel circuit configured to control a current flowing from a first power source to a second node in response to a voltage of a first node;

a first light emitting element connected to the second node;

a first transistor having a first electrode connected to the second node, a second electrode connected to a sensing line supplying the voltage of an initialization power source, and a gate electrode connected to a control line supplying a first control signal;

a second light emitting element electrically connected between the first light emitting element and a second power source; and a second transistor having a first electrode connected to a third node between the first light emitting element and the second light emitting element, a second electrode of the second transistor connected to the second power source, and a gate electrode connected to an inspection control line supplying a second control signal, wherein the pixel includes a first period for determining a defective pixel and a second period for checking connection failures of the first light emitting element and the second light emitting element, and wherein the pixel is configured to:

supply the first control signal of a gate-on level to the control line and the initialization power source of a first voltage level to the sensing line in the first period and the second period;

determine that a connection of the second light emitting element is abnormal during light emission by the pixel in the second period; and determine that a connection of the first light emitting element is abnormal during a period that the pixel does not emit light in the second period.

7. The display device of claim 6, wherein the pixel circuit includes:

a third transistor connected between the first power source and the second node, and having a gate electrode connected to the first node;

a fourth transistor connected between the first node and one of the data lines, and having a gate electrode connected to an i-th scan line; and a storage capacitor connected between the first node and the second node.

8. The display device of claim 7, wherein the pixel is configured to:

supply the scan signal of a gate on level to the i-th scan line and the second control signal of a gate-off level to an inspection line in the first period; and supply the scan signal of a gate-off level to the i-th scan line and the second control signal of a gate-on level to the inspection line in the second period.

* * * * *